United States Patent [19]

Stoddard et al.

[11] 3,815,150

[45] June 4, 1974

[54] FLEXIBLE DISC DRIVE

[75] Inventors: David L. Stoddard, Los Gatos; Frank M. Balbas, Campbell; David A. Brown; James T. Hook, both of San Jose, all of Calif.

[73] Assignee: Memorex Corporation

[22] Filed: June 23, 1972

[21] Appl. No.: 265,628

[52] U.S. Cl. .................................. 360/97, 346/137

[51] Int. Cl. ............................................ G11b 5/82

[58] Field of Search ............. 346/137; 340/174.1 C; 274/4 H, 4 J, 9 R, 39 A; 179/100.50

[56] References Cited

UNITED STATES PATENTS

| | | | |
|---|---|---|---|
| 3,526,884 | 9/1970 | Buslik et al. | 340/174.1 C |
| 3,566,381 | 2/1971 | Buslik et al. | 340/174.1 C |
| 3,581,064 | 5/1971 | Palmer | 340/174.1 C |
| 3,593,327 | 7/1971 | Shill | 340/174.1 C |
| 3,641,278 | 2/1972 | Kinjo | 340/174.1 C |
| 3,678,481 | 6/1972 | Deiziel | 340/174.1 C |

*Primary Examiner*—Vincent P. Canney

*Attorney, Agent, or Firm*—Karl A. Limbach

[57] ABSTRACT

A disc drive for flexible disc cartridge magnetic recording. The disc cartridge is placed in a holder without touching either the recording head or the disc drive spindle. Then the holder is pivoted generally parallel to the spindle axis to move the disc into engagement with the head and spindle. A special clamp on the holder clamps the disc to the spindle with a floating clamp member which can adapt itself to the axis of rotation of the spindle.

4 Claims, 5 Drawing Figures

FLEXIBLE DISC DRIVE

BACKGROUND OF INVENTION

A commercially available disc drive has been developed in recent years for handling computer programs prerecorded on flexible disc cartridges. The cartridge used with these drives is a flexible plastic disc coated with a magnetic recording layer and permanently supported in a flexible plastic envelope. The envelope has a central aperture for receipt of a drive spindle and a radial slot through which a magnetic reading head can engage the magnetic recording layer. These cartridges are inserted in a slot in the disc drive and then some element is operated manually to clamp the disc to a spindle.

A number of difficulties may be encountered with this commercially available disc drive. As the cartridge is inserted into the drive, the outside of the cartridge may touch the magnetic recording head which creates a risk of damage to the head. Mounting the head for retraction during cartridge loading is undesirable because retraction linkage will create complications with the precise head positioning linkage.

Additionally, problems may be encountered in the mechanism for clamping the disc to a spindle. If a clamp is part of the spindle, then the spindle construction is complex and expensive. If the clamp is mounted on a separate axis on the opposite side of the disc from the spindle, slight misalignment of the spindle and clamp axis will produce head tracking problems.

Additional problems are produced where the disc drive spindle is movably mounted for insertion into the central aperture of the cartridge after the cartridge has been inserted in the drive.

In accordance with this invention we have provided a new design for a disc cartridge drive in which all of these disadvantages are avoided. In our new drive, a simple spindle is mounted on a frame, and a disc cartridge holder is movably mounted, preferably pivoted so that it moves between a loading position and an operating position. When the holder is in the loading position, cartridges can be inserted into the drive in a direction parallel to their faces without touching the spindle or head. Thereafter, the holder pivots toward the spindle to mount the disc on the spindle and press the recording surface against the recording head.

An accurate disc locating surface is provided on the spindle for centering the disc as the holder moves and a clamp is mounted on the holder for holding the disc against the spindle as the spindle moves into the disc aperture. The clamp has a special free floating design which permits the clamp to accept the rotation axis of the spindle even when the axis of the clamp is misaligned with the spindle.

A simple cam operating mechanism for moving the disc holder completes the design to produce a drive for flexible disc cartridges which at the same time eliminates the difficulties of the commercially available drive and dramatically reduces the number of parts and cost of the drive.

Other features and advantages of the invention will become apparent from the following description of a preferred embodiment of the invention read in connection with the attached drawings in which.

Figure 1:
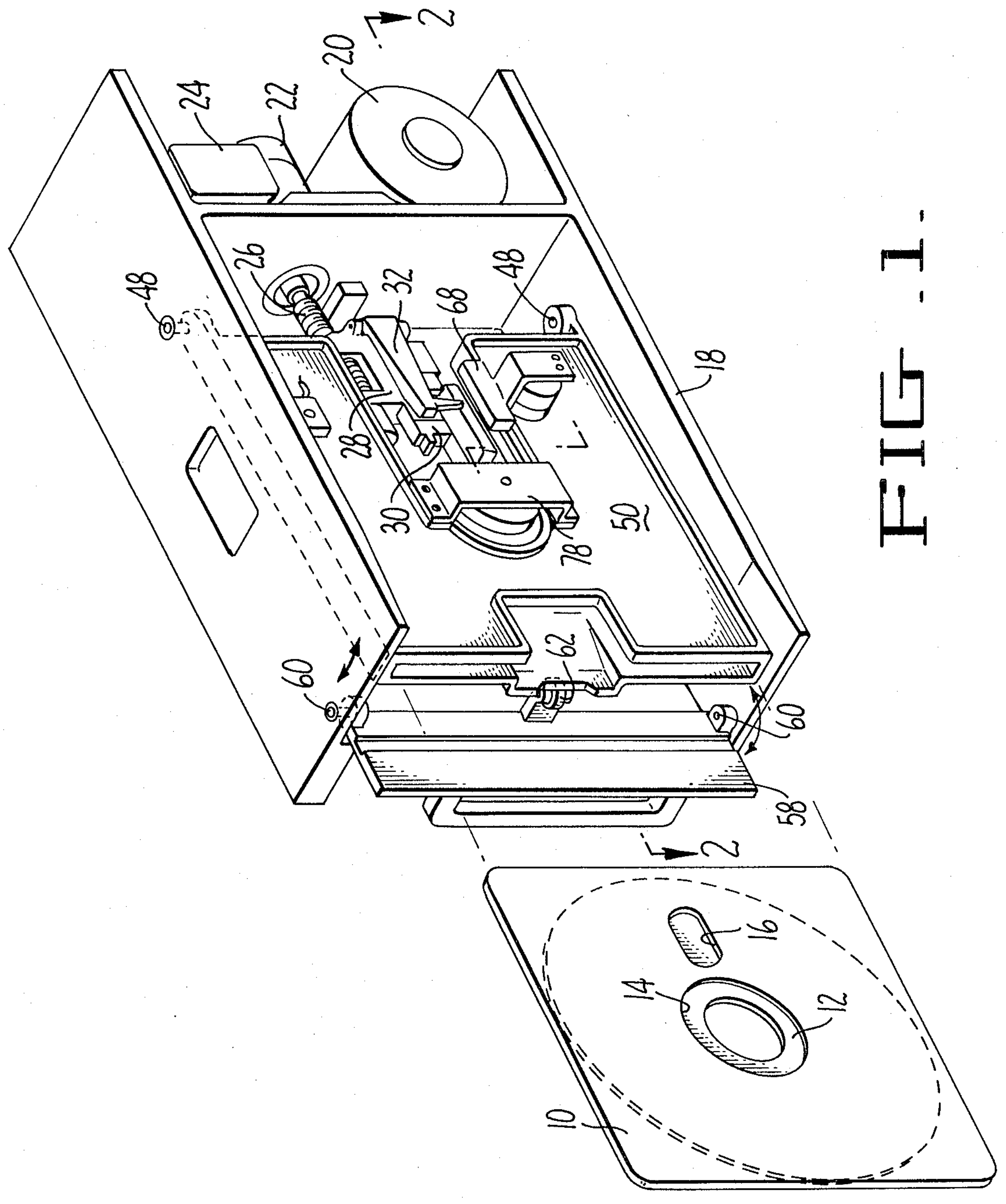
FIG. 1 is an asymmetric view of a flexible disc cartridge recorder constructed in accordance with the principles of the invention.

Referring now in detail to the drawings and particularly to FIG. 1, the flexible disc cartridge used with this apparatus includes a cartridge 10 containing a magnetic recording disc 12 and having a central aperture 14 through which the disc may be mounted on a spindle and a radial aperture 16 through which a magnetic recording head may extend for access to the recording surface of the disc.

The disc drive is built on a rigid frame 18 which supports a drive motor 20, a head positioning motor 22, and a number of electrical components, one of which is shown at 24.

The head drive motor 22 operates a lead screw 26 to position a carriage 28 which supports a magnetic recording head 30 and a pressure plate 32. When the disc cartridge is positioned in the machine in recording position, the magnetic recording head 30 extends through one of the apertures 16 on one side of the cartridge to engage the recording surface while the pressure plate 32 extends through the aperture 16 in the other wall of the cartridge to hold the magnetic recording disc 12 against the recording head 30. The motor 22 may then be operated to advance the lead screw 26 to position the recording head 30 radially of the recording disc.

Figure 2:
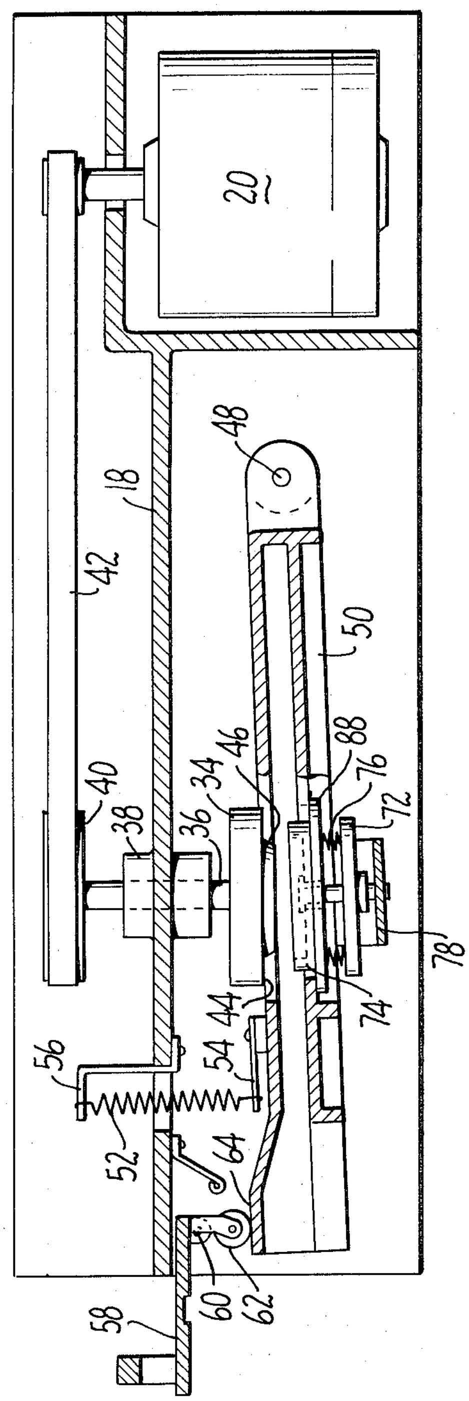
FIG. 2 is a horizontal sectional view of the recorder of FIG. 1 taken slightly above the central spindle and illustrating the apparatus in open position for receipt of a cartridge.
Figure 3:
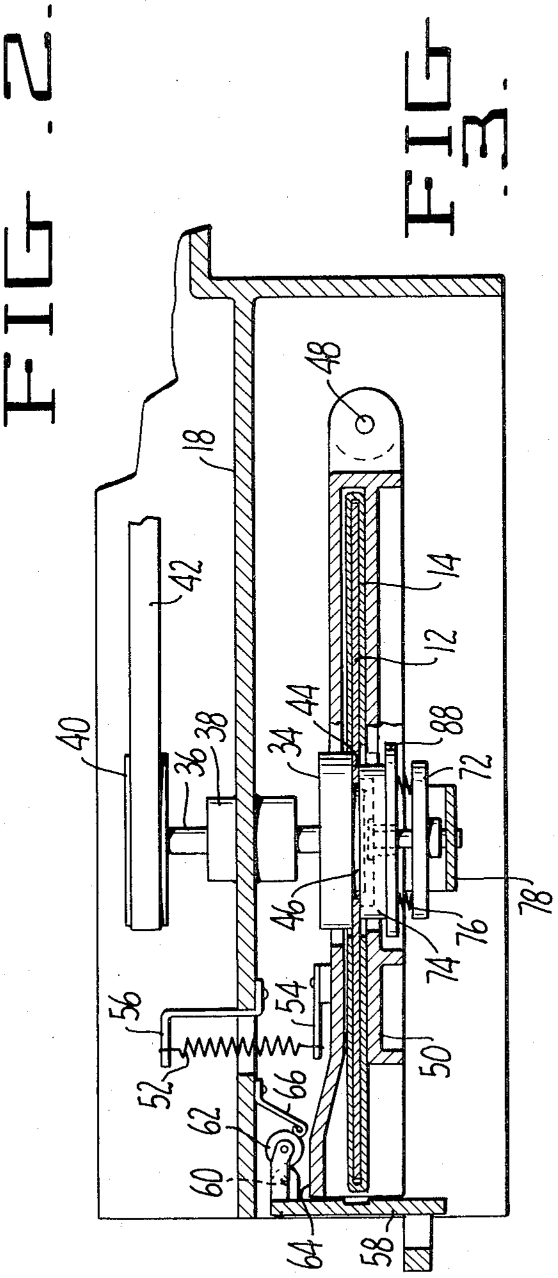
FIG. 3 is a view similar to FIG. 2 showing the apparatus closed in recording position.
Figure 4:
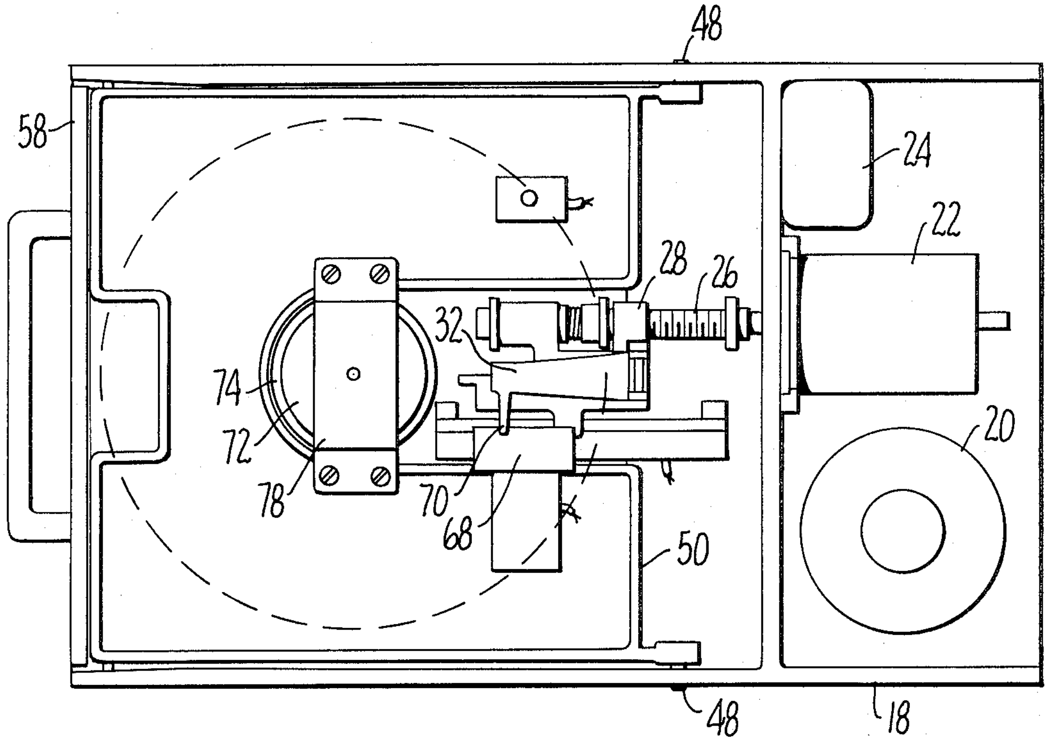
FIG. 4 is a side elevational view of the apparatus of FIG. 1.

Referring to FIGS. 2 and 3, a disc drive spindle 34 is mounted on a shaft 36 in a bearing assembly 38 on the frame 18. The shaft 36 carries a drive pulley 40 which is driven from the motor 20 by a drive belt 42.

The spindle 34 has a flat support surface 44 which engages the recording disc 12 when the disc is mounted in recording position. Additionally, the spindle 34 has a conical surface 46 which positions the disc accurately on the spindle, the conical surface 46 terminates at a cylindrical surface (not shown) adjacent to the flat surface 44 with a diameter slightly greater (0.0001 inch) than the diameter of the central aperture in the disc 12.

A pair of pivot pins 48 support a record holder 50 on the frame 18 and permits the holder 50 to swing between a cartridge loading position shown in FIG. 2 and a recording position shown in FIG. 3. A spring 52 is connected between a bracket 54 on the holder 50 and a bracket 56 on the frame 18 for resiliently urging the holder 50 toward the recording position of FIG. 3, and it will be noted that the spring 52 provides the clamping pressure by which the disc drive clamps a disc 12 to the spindle surface 44. An access door 58 is pivotally mounted on the frame 18 at pivot axis 60, and carries a roller 62 which cooperates with a cam surface 64 on the record holder 50 to move the holder 50 to the loading position of FIG. 2 when the door 58 is opened. A spring detent finger 66 engages the roller 62 to hold the door in a closed position.

A blade 68 is mounted on the holder 50 and engages a finger 70 on the pressure plate 32 to retract the pressure plate 32 from the disc when the holder 50 is moved to the loading position of FIG. 2.

Figure 5:
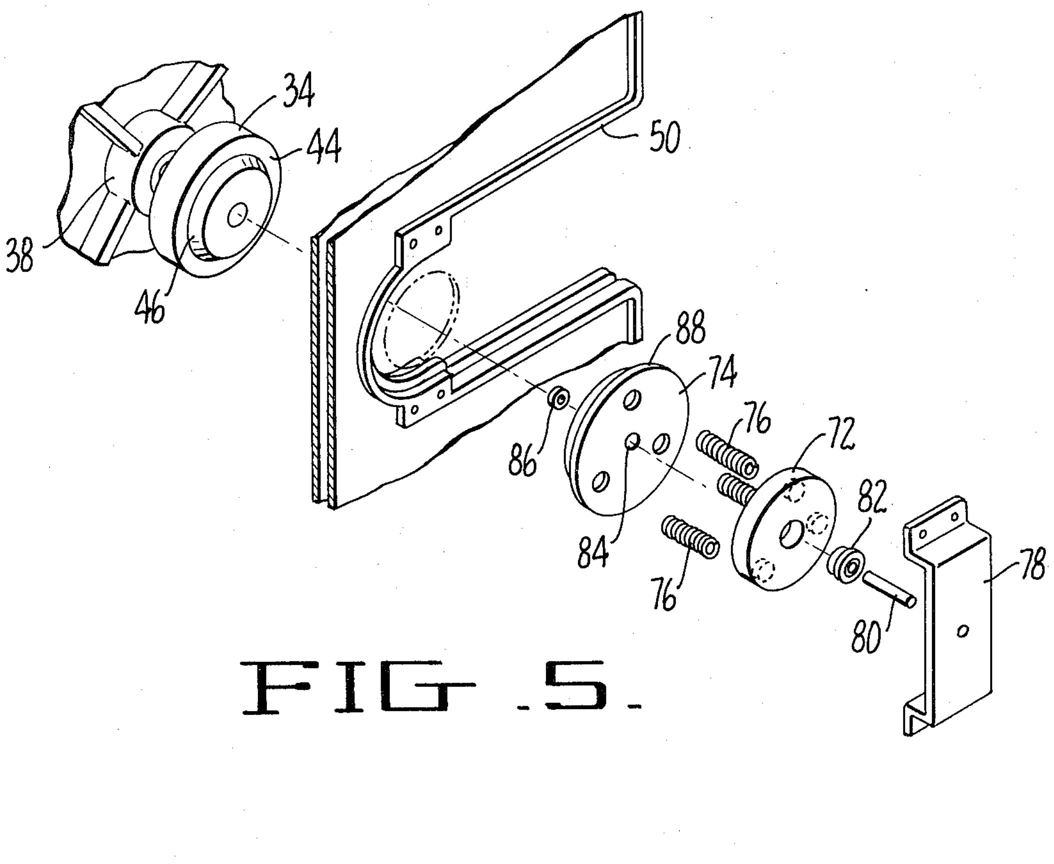
FIG. 5 is an exploded view of the disc clamping mechanism in the apparatus of FIGS. 1–4.

With reference to FIG. 5, the mechanism for clamping the recording disc onto the spindle 34 comprises a first member 72 and a second member 74 which are connected together by three compression springs 76. The first member 72 is mounted on the cartridge holder 50 by means of a support bracket 78, a pivot pin 80 and a bearing 82. The pivot pin 80 extends through a central aperture 84 in the member 74 and is connected to a lock ring 86. The aperture 84 is substantially larger than the pivot pin 80, however, so that the member 74 can move radially of the axis of pivot pin 80 if the pivot pin 80 is not exactly aligned with the axis of the spindle 34. The clamp member 74 has a forward face which engages the disc 12 and holds the disc against the surface 44 of the spindle in the recording position of FIG. 3, and a central recess in the clamping member 74 provides clearance for entry of the conical portion 46 of the spindle. The clamping member 74 also has a peripheral flange 88 which engages the holder 50 in the cartridge loading position of FIG. 2, but the flange 88 moves away from the cartridge holder 50 in the recording position of FIG. 3. It will be apparent that the clamping member 74 in the recording position of FIG. 3 may contact only the disc 12 and the three springs 76.

It will be apparent that the cartridge 10 may be inserted into the holder 50 when the apparatus is in the position of FIG. 2 and as the cartridge enters, no part of the cartridge or recording disc comes in contact with either the spindle 34 or the magnetic recording head 30. As the access door 58 is closed, the holder 50 swings from the position of FIG. 2 to the position of FIG. 3 thereby bringing the recording surface on the disc 12 in contact with the recording head 30 and clamping the central hub of the disc accurately on the spindle 34.

While one specific embodiment of the invention has been illustrated and described in detail herein, it is obvious that many modifications thereof may be made within the spirit and scope of the invention.

We claim:

1. A magnetic recording disc drive adapted to receive a flexible disc cartridge and rotate a flexible apertured disc in said cartridge which comprises:

a frame with a drive spindle mounted thereon for rotating a magnetic recording disc, a magnetic transducer head on said frame for reading a disc which is rotating on said spindle, a disc holder mounted on the frame for movement toward and away from said spindle with said holder adapted to removably receive a flexible disc cartridge with said holder positioned to support said cartridge away from said spindle and head and move the cartridge to said spindle and head as it moves toward the spindle, and a clamp on the opposite side of said holder from said spindle movable toward said spindle as said holder moves toward said spindle to clamp a disc in said holder against said spindle with said clamp rotatable with the spindle, said disc drive characterized further in that said clamp comprises a first member mounted on said holder for rotation about an axis generally coaxial with said spindle and a second member adapted to engage and hold a disc against the spindle with said second member mounted on said first member for rotation therewith but free to move radially of said axis.

2. The disc drive of claim 1 in which a plurality of compression springs are connected between the first and second members of said clamp.

3. A disc drive for handling magnetic recording flexible disc cartridges comprising:

a unitary frame having a main web and a lateral web generally perpendicular thereto, a spindle mounted on said main web for rotating a magnetic recording disc about an axis generally perpendicular to said main web, a head positioning motor having a motor axle with a lead screw integrally formed with said axle with said motor mounted on said lateral web supporting said lead screw extending through said lateral web and cantilevered from said lateral web toward said spindle generally perpendicular to said lateral web, and a magnetic head supported on said lead screw for motion toward and away from said spindle responsible to rotation of said axle.

4. A support hub for clamping a magnetic recording disc against a spindle comprising a first member adapted to be mounted for rotation about an axis generally coaxial with a spindle, a second member adapted to engage and hold a disc against a spindle, and a plurality of springs interconnecting said first and second members for rotation about said axis while permitting said second members to move radially of said axis.

* * * * *